United States Patent
Wakazono et al.

(10) Patent No.: US 7,326,298 B2
(45) Date of Patent: Feb. 5, 2008

(54) WIRE INSULATING LINE

(75) Inventors: Takehiko Wakazono, Hyogo (JP); Kazuhisa Fukutani, Kobe (JP); Naoyuki Tashiro, Hyogo (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 0 days.

(21) Appl. No.: 11/245,330

(22) Filed: Oct. 7, 2005

(65) Prior Publication Data

US 2006/0081177 A1   Apr. 20, 2006

(30) Foreign Application Priority Data

Oct. 20, 2004  (JP) .............................. 2004-305206
Oct. 27, 2004  (JP) .............................. 2004-312915

(51) Int. Cl.
   *B05C 11/02* (2006.01)
(52) U.S. Cl. ........................................ 118/125; 118/69
(58) Field of Classification Search .................. 118/69, 118/125, 420, 67–68; 425/66, 71; 264/179, 264/181
   See application file for complete search history.

(56) References Cited

U.S. PATENT DOCUMENTS

| | | | |
|---|---|---|---|
| 3,604,392 A | * | 9/1971 | Kawazoe et al. ............. 118/67 |
| 3,619,454 A | * | 11/1971 | Sakata et al. ................ 264/180 |
| 3,852,875 A | * | 12/1974 | McAmis et al. ............. 29/527.4 |
| 3,853,447 A | * | 12/1974 | Steinberg ..................... 425/223 |
| 5,249,427 A | | 10/1993 | Ikegami et al. |

FOREIGN PATENT DOCUMENTS

| | | |
|---|---|---|
| JP | 60-144333 | 7/1985 |
| JP | 6-338231 | 12/1994 |
| JP | 10-87164 | 4/1998 |
| JP | 2951379 | 7/1999 |

* cited by examiner

*Primary Examiner*—Brenda A. Lamb
(74) *Attorney, Agent, or Firm*—Oblon, Spivak, McClelland, Maier & Neustadt, P.C.

(57) ABSTRACT

In a wire insulating line, a cooling device that cools down a traveling high-temperature linear material, which is resin-coated by an extruder, in cooling water includes a reservoir tank that reserves the cooling water and allows the linear material to pass therein, and water spray nozzles that are provided in plural numbers in the reservoir tank with a gap along the linear material traveling direction and spray water to the linear material in the cooling water. Further, in the wire insulating line, a coated wire haul-off machine includes front and rear capstans for winding the coated wire, which comes out of the reservoir tank and on the way to a take-up machine, by allowing it to reciprocate back and forth for several times, and a water film flow forming groove body to form water film flow for cooling, which is arranged between the front and rear capstans and extends along a lower coated wire traveling path between the front and rear capstans, in which the haul-off machine is constituted that the coated wire is allowed to travel in the water film flow between the front and rear capstans.

9 Claims, 13 Drawing Sheets

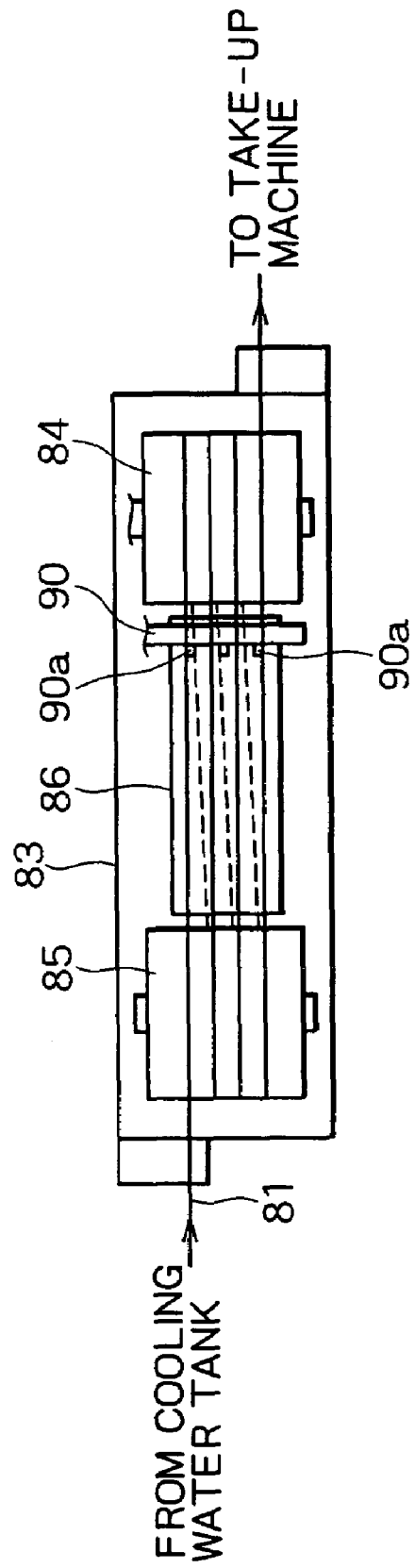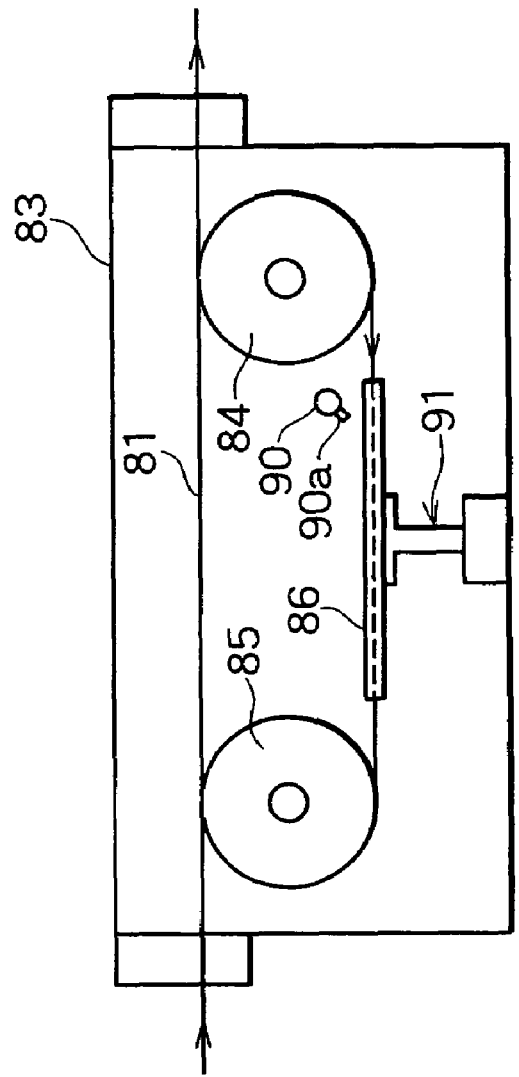
FIG. 9A
FIG. 9B

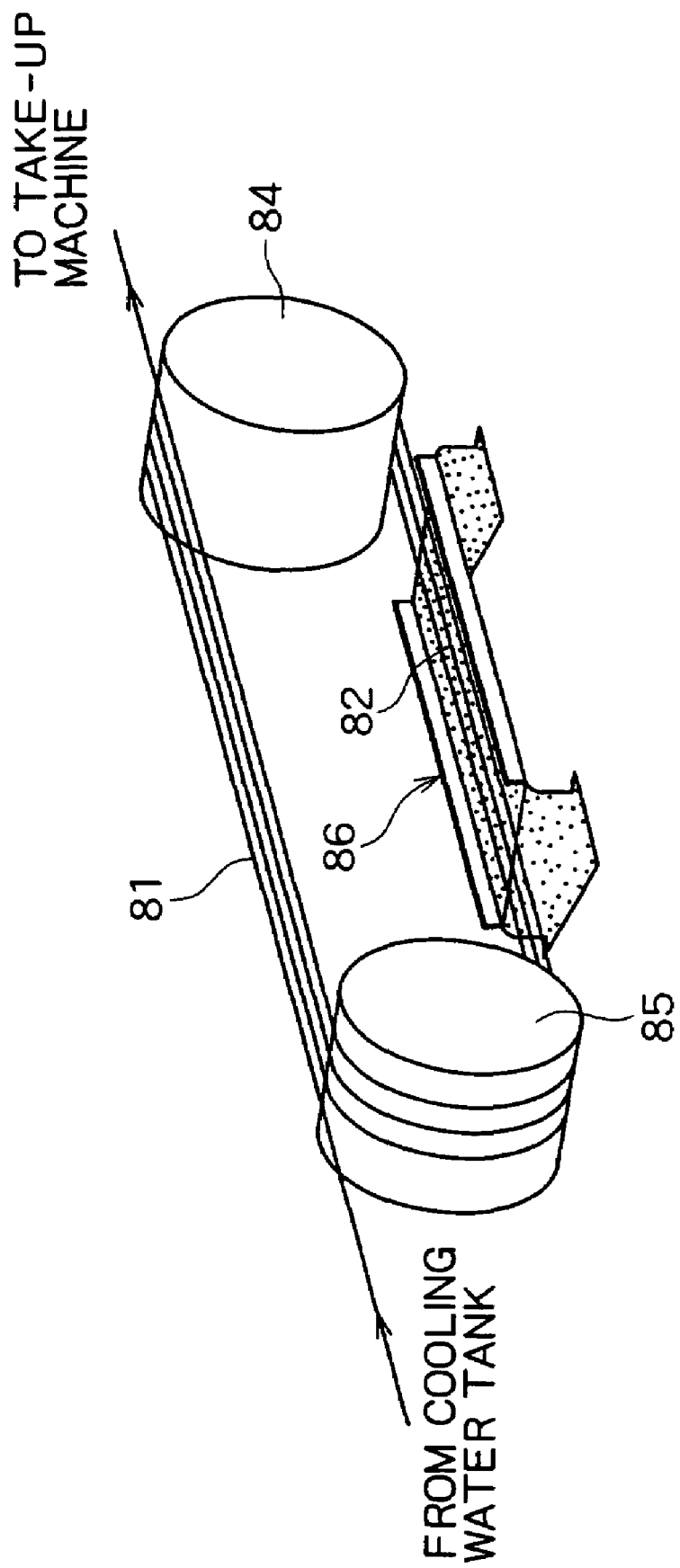

WIRE INSULATING LINE

BACKGROUND OF THE INVENTION

1. Field of the Invention

The present invention relates to a wire insulating line. Particularly, the present invention relates to a cooling device for cooling down a traveling high-temperature coated wire in a cooling water tank and a cooling mechanism provided between the cooling tank and a take-up machine.

2. Background Art

A wire insulating line is designed to apply resin coating on a core wire while making the core wire to travel, cool down the resin-coated and traveling high-temperature coated wire, and take up the cooled-down coated wire. Such a wire insulating line is provided with a cooling device for cooling down the traveling high-temperature coated wire after resin application in order to set the resin coating, which has been applied by an extruder, by cooling (coagulation fixing, cooling solidification).

Conventionally, the cooling device for coated wire is generally constituted such that the high-temperature coated wire after resin application by the extruder is cooled down by being allowed to soak and travel in cooling water of a cooling water tank (reservoir tank) that extends horizontally. Note that the temperature of the resin coating after resin application by the extruder is generally 150 to 300° C., and is about 180° C. when the resin coating is PVC (polyvinyl chloride), for example.

However, since the conventional cooling device for coated wire, which is constituted by the cooling water tank (reservoir tank), simply allows the high-temperature coated wire to travel in the cooling water of the cooling water tank, it has had disadvantages that cooling speed to the coated wire was slow, a long cooling water tank where a traveling distance of the coated wire could be secured was necessary, and a large installing space was required.

Further, a coated wire haul-off machine is another constituent element of the wire insulating line. The coated wire haul-off machine is provided between the cooling water tank and the take-up machine in the wire insulating line, hauls-off the coated wire sent from the cooling water tank to allow it to travel, and also cools down the coated wire in the cooling water. FIG. 17 is a schematic block diagram showing an example of a conventional coated wire haul-off machine. As shown in FIG. 17, a conventional coated wire haul-off machine 58 includes front and rear capstans 60, 61 for winding a coated wire 56 by allowing it to reciprocate back and forth for several times in a casing 59 and a plurality of shower nozzles 62 that spray the cooling water to the coated wire 56 traveling between the front and rear capstans 60, 61, in the casing 59 where the traveling line of the coated wire 56 is arranged to pass inside thereof. Note that the lower stream (right side in FIG. 17) of the same traveling direction of the coated wire in a coated wire manufacturing line is defined as front and the upper stream (left side in FIG. 17) of the direction is defined as rear, in this specification.

On the other hand, Japanese Patent Laid-Open No.Hei6-338231 publication discloses a wire cooling apparatus that cools down a resin coated layer of a coated wire that has been cooled down in a cooling water tank in a state where the wire is wound on an accumulator. FIG. 18 is a schematic block diagram showing the constitution of a wire cooling apparatus according to prior art.

The wire cooling apparatus is arranged between the cooling water tank and the take-up machine (more specifically, between the haul-off machine and the take-up machine in the lower stream of the cooling water tank) as shown in FIG. 18, and includes an accumulator 72 that comprises front and rear turn sheaves 72A, 72B for absorbing a speed difference between the haul-off speed of a coated wire 71 and the take-up speed of the take-up machine, a cooling tray 73 that is arranged under the accumulator 72 while reserving the cooling water and cools down the coated wire 71 accumulated around the accumulator 72 by allowing the wire to travel in the cooling water, and a tension additional mechanism (not shown) that moves the front turn sheave 72A in the arrow 74 directions to absorb speed fluctuation of the coated wire 71.

As described, the cooling tray 73 is arranged under the accumulator 72, a part of the front and rear turn sheaves 72A, 72B sinks in the cooling water of the box-shaped cooling tray 73 whose upper portion is opened, the coated wire 71 traveling on a lower coated wire traveling path between the front and rear turn sheaves 72A, 72B sinks deeply, and thus the coated wire 71 accumulated around the accumulator 72 is cooled down.

However, since the above-described coated wire haul-off machine 58 including the shower nozzles 62 is designed to spray the cooling water in a shower state to the coated wire 56 traveling between the front and rear capstans 60, 61, it has lower cooling capability than the one allowing wires to travel in the cooling water, and there are cases where the coated wire 56 is not sufficiently cooled down to a predetermined temperature when wire speed is increased and a part of its resin coating is crushed when the wire is taken up by the take-up machine in the lower stream to cause shape deformation.

Then, to cool down the coated wire in the coated wire haul-off machine, applying the above-described cooling tray 73 of the wire cooling device to the coated wire haul-off machine instead of the shower nozzles 62 is considered.

However, in the case of the coated wire haul-off machine including the cooling tray, a part of each of the front and rear turn sheaves 72A, 72B (hereinafter referred to as capstans) sinks in the cooling water in the box-shaped cooling tray whose upper portion is opened, and the coated wire traveling on the lower coated wire traveling path between the front and rear capstans travels in the cooling water at a certain depth. For this reason, stress (tensile stress) applied to the coated wire when the wire is pulled to travel against resistance applied to the coated wire due to contact with the cooling water, that is, stress (tensile stress) applied to the coated wire caused by the contact with the cooling water becomes large. Further, since a part of each of the front and rear capstans sinks in the cooling water, the cooling water hinders rotation of the capstans and the coated wire is pulled to travel against the water, so that the stress applied to the coated wire further increases.

Consequently, in the case where the cooling tray is provided in the coated wire haul-off machine instead of the shower nozzles, although such a machine has higher cooling capability than the one provided with the shower nozzles, it has larger stress applied to the coated wire, which is caused by the contact with the cooling water, and adherent force between resin coating and the core wire could be reduced due to stretch of the coated wire by the stress.

SUMMARY OF THE INVENTION

Therefore, it is the first object of the present invention to provide a wire insulating line having a cooling device, in which, during cooling a traveling high-temperature coated wire after resin coating in cooling water, cooling speed to the coated wire can be increased to shorten a coated wire traveling distance required for cooling in comparison to a conventional distance, to make the device more compact and to minimize space of an installing area.

Further, it is the second object of the present invention to provide a wire insulating line having a coated wire haul-off machine, which has high cooling performance to a coated wire in a state where stress applied to the coated wire, which is caused by contact with the cooling water, is minimized, and is capable of cooling down the coated wire to a predetermined temperature without reducing adhesive force between resin coating and a core wire due to stretch of the coated wire by the stress.

To solve the first object, the following technical means is taken in the present invention. Specifically, the wire insulating line of the present invention comprises: an extruder for coating resin to the core wire; a cooling device for cooling down the coated wire, which is extruded from the extruder and allowed to travel, in the cooling water; a coated wire haul-off machine that hauls the coated wire from the cooling device to allow it to travel and cools down the coated wire by cooling water; and a take-up machine for taking up the coated wire from the coated wire haul-off machine, in which the cooling device comprises: a reservoir tank that reserves the cooling water and allows the coated wire to pass therein; and water spray nozzles that are provided in plural numbers in the reservoir tank with a gap along the coated wire traveling direction and spray water to the coated wire in the cooling water.

Herein, it is preferable that the water spray nozzles are arranged in a facing manner to each other so as to sandwich a linear material traveling path.

The linear material cooling device of the present invention includes the water spray nozzles, which are provided in plural numbers along the traveling path with a gap from the upper stream to the lower stream and spray water to a linear material in the cooling water, in the reservoir tank where high-temperature coated wire after resin coating is led to travel in the cooling water. Therefore, by agitating the cooling water in the reservoir tank with water flow that is generated by spraying water from the water spray nozzles, new cooling water flow is continuously led to contact the surface of the coated wire traveling in the cooling water, and heat exchange between the coated wire and the cooling water is performed more efficiently than the conventional device having no water spray nozzle thereby increasing the cooling speed to the coated wire. With this device, the coated wire traveling distance required for cooling down to a predetermined temperature is shortened from that of the conventional device, and the device can be more compact to minimize the space of the installing area.

To solve the second object, the following technical means is taken in the present invention. Specifically, the coated wire haul-off machine of the wire insulating line of the present invention comprises: front and rear capstans for winding the coated wire, which comes out of the reservoir tank and on the way to the take-up machine after the wire is resin-coated and led into the reservoir tank, by allowing it to reciprocate back and forth for several times; and a water film flow forming groove body to form water film flow for cooling, which is arranged between the front and rear capstans and extends along the lower coated wire traveling path between the front and rear capstans, in which the coated wire haul-off machine is constituted that the coated wire is allowed to travel in the water film flow between the front and rear capstans.

According to the above-described constitution, by allowing the coated wire to travel in the water film flow being the cooling water of a low water level, it is possible to maintain high cooling performance to the coated wire in the state where stress applied to the coated wire caused by the contact with the cooling water is minimized. Thus, the coated wire can be cooled down to a predetermined temperature without reducing the adhesive force between the resin coating and the core wire due to the stretch of the coated wire by the stress.

In the coated wire haul-off machine, it is preferable to include a water supply tube for allowing the cooling water to flow from a coated wire input side of the water film flow forming groove body into the water film flow forming groove body.

With this constitution, the cooling water is carried by the traveling coated wire, so that the cooling water easily reaches the entire coated wire on the lower coated wire traveling path and the machine can exert high cooling performance to the coated wire. Furthermore, the stress applied to the coated wire is minimized since the water film flow flows in the same direction as the coated wire traveling direction.

Further, the coated wire haul-off machine may further include a groove body lifting and lowering device for temporarily lowering the water film flow forming groove body from a regular position for cooling the coated wire when starting manufacturing of the coated wire. With this constitution, even if a traveling speed difference is caused by a difference in wire diameter due to simultaneous presence of an area having only the core wire and a resin-coated wire area between the front and rear capstans, and wire slack occurs between the front and rear capstans, when starting manufacturing of the coated wire, interference between the wire traveling between the front and rear capstans and the surface of the water film flow forming groove body can be avoided by lowering the water film flow forming groove body below the regular position during cooling the coated wire by the groove body lifting and lowering device. As a result, a wire can be prevented from being come off from the front and rear capstans.

Further, in the coated wire haul-off machine, the water film flow forming groove body comprises a bottom plate extending along the traveling path of the coated wire, and a left plate and a right plate which are severally provided on both sides of the bottom plate along the traveling path (wall plates in the orthogonal direction to the traveling direction), and can be constituted that an input end and an output end of the coated wire are completely opened. With this constitution, necessary water film flow can be easily realized.

BRIEF DESCRIPTION OF THE DRAWINGS

FIG. 9 is a schematic view of a coated wire haul-off machine according to one embodiment of the present invention, where 9A is a plan view and 9B is a side sectional view.

FIG. 10 is a perspective view of a principal portion of the coated wire haul-off machine shown in FIG. 9.

PREFERRED EMBODIMENTS OF THE INVENTION

Figure 1:
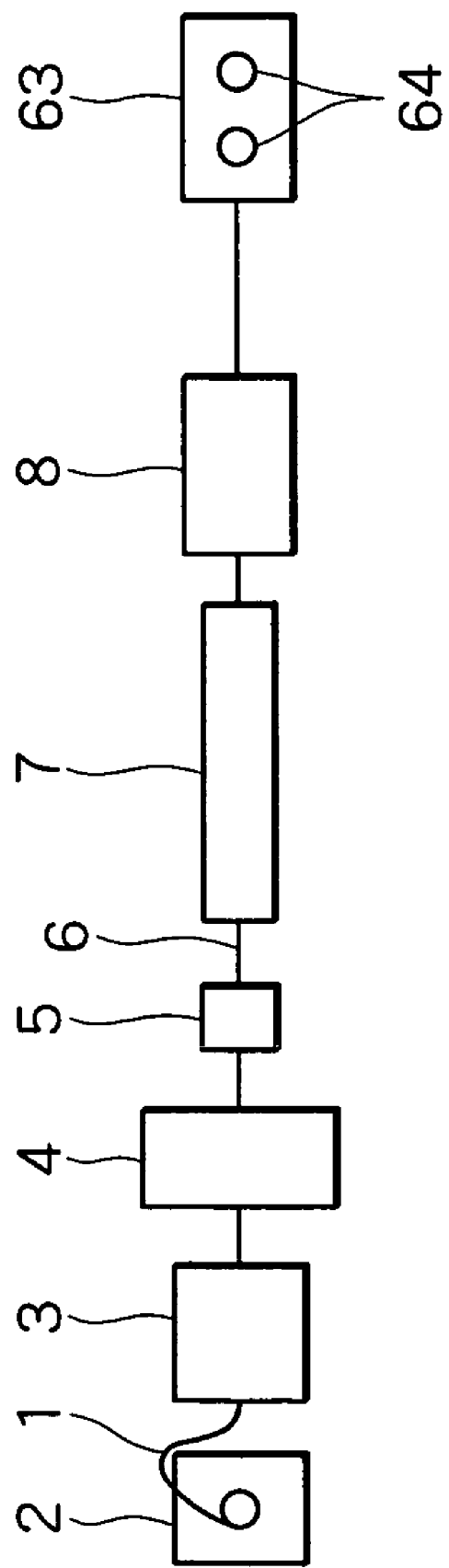
FIG. 1 is a schematic view showing a constitution of a wire insulating line.

FIG. 1 schematically shows a general constitution of a wire insulating line. In this manufacturing apparatus, a pay off unit 2 having a supply reel of a core wire (conductor) 1, a wire drawing machine 3 and a continuous annealing machine 4 are provided on the upper stream side, and an extruder 5 that applies resin coating insulator) on the core wire is provided on the lower stream side of the continuous annealing machine 4. Then, on the further lower stream of the extruder 5, a cooling water tank 7 for cooling down to harden a high-temperature coated wire 6 that is resin-coated and allowed to travel and a coated wire haul-off machine 8 that hauls the coated wire 6 from the cooling water tank 7 to allow it to travel are provided. The coated wire 6 from the coated wire haul-off machine 8 is wound onto bobbins 64 in a take-up machine 63 via a dancer roller (not shown).

Herein, the coated wire haul-off machine 8 is constituted that it hauls the coated wire 6 from the cooling water tank 7 to allow it to travel and cools down the coated wire 6 in order to cool down the coated wire 6 to a predetermined temperature complementing the cooling performance of the cooling water tank 7 when the speed of the coated wire 6 is increased to improve productivity.

Further, in the following description, a device for cooling down to harden the high-temperature coated wire 6, which is resin-coated by the extruder 5 and allowed to travel, is simply referred to as a "cooling device". The cooling device includes the cooling water tank 7 and its associated elements.

Figure 2:
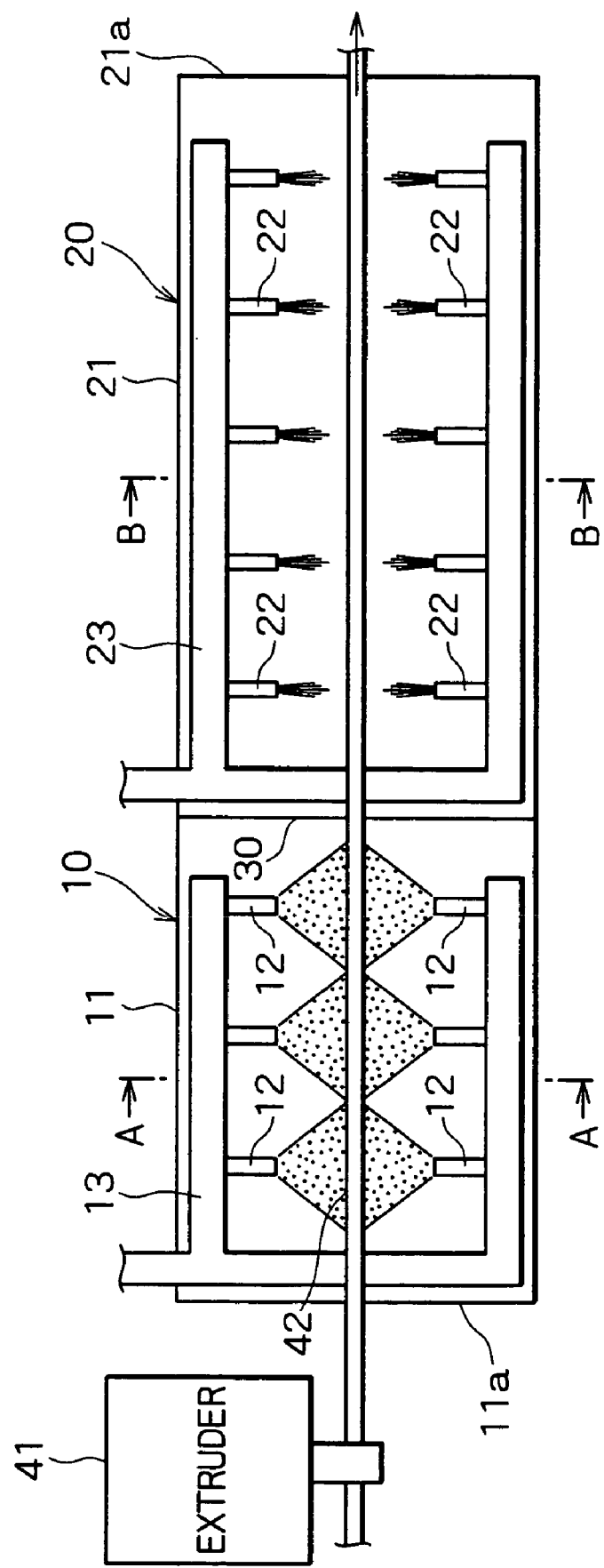
FIG. 2 is a plan view schematically showing a constitution of a cooling device according to one embodiment of the present invention.

In the following, an embodiment of the cooling device of the present invention will be described with reference to the drawings. FIG. 2 is the plan view schematically showing the constitution of the cooling device according to one embodiment of the present invention, FIG. 3 is the A-A cross-sectional view of the pre-cooling section in FIG. 2, and FIG. 4 is the B-B cross-sectional view of the main cooling section in FIG. 2.

Figure 3:
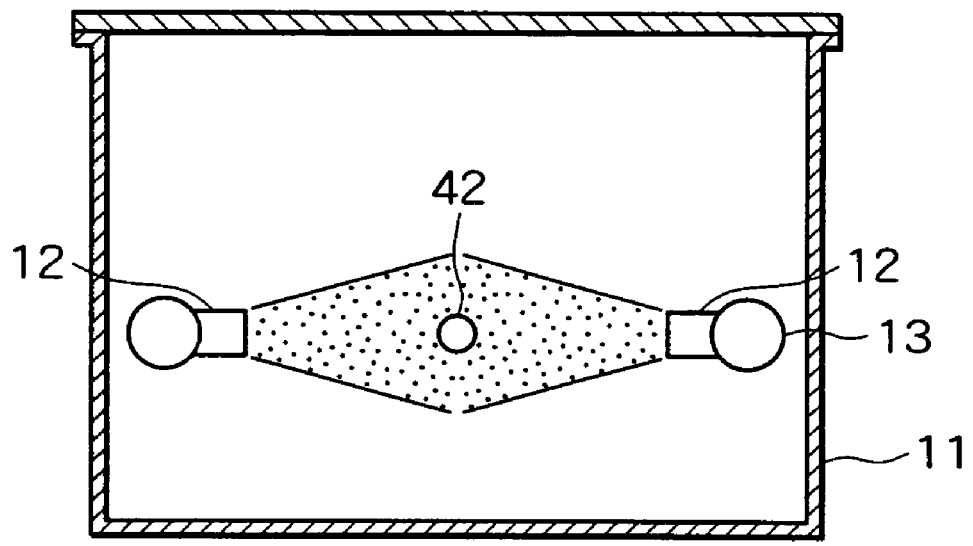
FIG. 3 is an A-A cross-sectional view of a pre-cooling section in FIG. 2.
Figure 4:
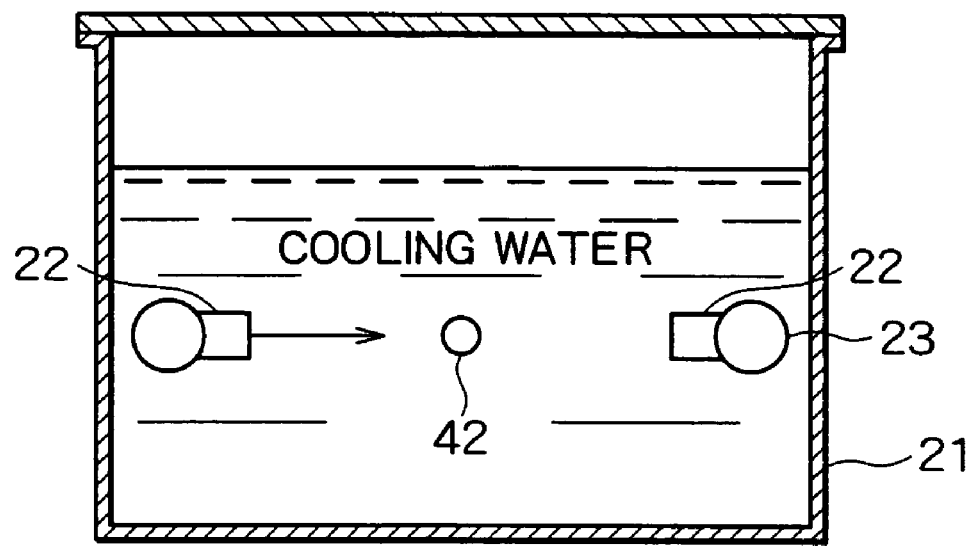
FIG. 4 is a B-B cross-sectional view of a main cooling section in FIG. 2.

As shown in FIG. 2 to FIG. 4, the cooling device of the present invention is provided in the wire insulating line, and cools down a traveling high-temperature coated wire 42 that is resin-coated by an extruder 41. The device is installed on a position between the extruder 41 and a haul-off machine (not shown), and includes a pre-cooling section 10 in which the high-temperature coated wire 42 from the extruder 41 passes and a main cooling section 20 in which the coated wire 42 having passed the pre-cooling section 10 passes. A reservoir tank 21 of the main cooling section 20 is provided in connection with a receiving tank 11 of the pre-cooling section 10.

The pre-cooling section 10 includes the receiving tank 11, a plurality of mist spray nozzles 12 and a cooling water supply tube 13. The receiving tank 11 has a box shape with a lid whose upper portion can be opened. The plurality of mist spray nozzles 12 are provided in the receiving tank 11 with a predetermined gap along the traveling direction of the coated wire 42 from the upper stream to the lower stream and in the state of facing arrangement so as to sandwich a traveling path of the coated wire 42. The cooling water supply tube 13 supplies the cooling water to each mist spray nozzle 12 in order to allow the mist spray nozzle 12 to spray the cooling water in a conical shape with a mist state.

Further, the main cooling section 20 includes the reservoir tank 21, a plurality of water spray nozzles 22 and a pressurized water supply tube 23. The reservoir tank 21 is in a box shape with a lid whose upper portion can be opened, reserves the cooling water, and allows the coated wire 42 to travel in the cooling water. The plurality of water spray nozzles 22 are provided in the reservoir tank for spraying water in the cooling water, with a predetermined gap along the traveling direction of the coated wire 42 from the upper stream to the lower stream and in the state of facing arrangement so as to sandwich the traveling path of the coated wire 42. The pressurized water supply tube 23 supplies pressurized water to the water spray nozzles 22.

A receiving tank end plate 11a of the receiving tank 11 is provided with a U-shape cutout opening (not shown) to allow the coated wire 42 to pass through the opening. Furthermore, a common partition wall 30 between the receiving tank 11 and the reservoir tank 21 and a reservoir tank end plate 21a are also provided with the U-shape cutout opening (not shown) to allow the coated wire 42 to pass through the opening. Although the cooling water in the reservoir tank 21 overflows from the U-shape cutout opening of the common partition wall 30 and the U-shape cutout opening of the reservoir tank end plate 21a, the cooling water is supplied to the reservoir tank 21 through the water spray nozzles 22 via the pressurized water supply tube 23 to maintain a fixed water level. Then, a drain container and drain piping (both are not shown) for sending back and circulating the cooling water from the reservoir tank 21 are provided under the reservoir tank end plate 21a of the reservoir tank 21. In addition, a drain container and drain piping (both are not shown) are provided under the receiving tank 11 to send back the cooling water sprayed from the mist spray nozzles 12 in a mist state and the cooling water from the U-shape cutout opening of the common partition wall 30.

In the cooling device constituted in this manner, the traveling high-temperature coated wire 42 from the extruder 41 enters the receiving tank 11 first, the cooling water spreads in a conical shape and in a mist state and is sprayed evenly onto the wire while the wire passes in the receiving tank 11, and the wire is cooled down to a predetermined temperature to promote its hardening.

The coated wire 42 comes out from the receiving tank 11 and immediately enters the reservoir tank 21. While the wire passes through the reservoir tank 21, water flow which is generated toward the coated wire 42, and caused by spraying water from the spray nozzles 22, positively agitates the cooling water in the reservoir tank 21, and thus new cooling water flow is continuously led to contact the surface of the coated wire 42 traveling in the cooling water. Accordingly, heat exchange between the coated wire 42 and the cooling water is performed more efficiently than the case having no water spray nozzle 22 and the cooling speed to the coated wire 42 can be increased. It is possible to cool down the coated wire 42 to a predetermined temperature while passing in the reservoir tank 21 even when the length of the reservoir tank 21 in the coated wire traveling direction is shorter than a conventional one, and the wire can be hardened to prevent deformation of sectional shape when taking up the wire.

Figure 6:
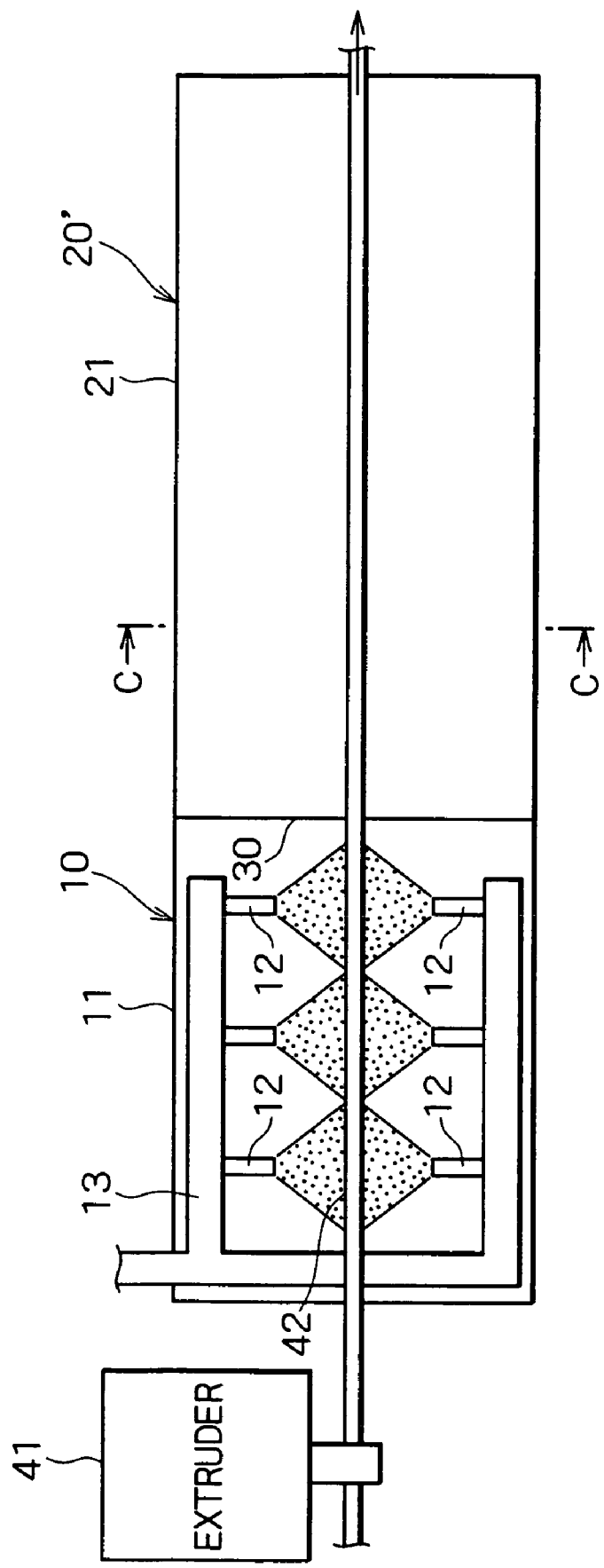
FIG. 6 is a plan view schematically showing a constitution of a cooling device being a comparative example.
Figure 7:
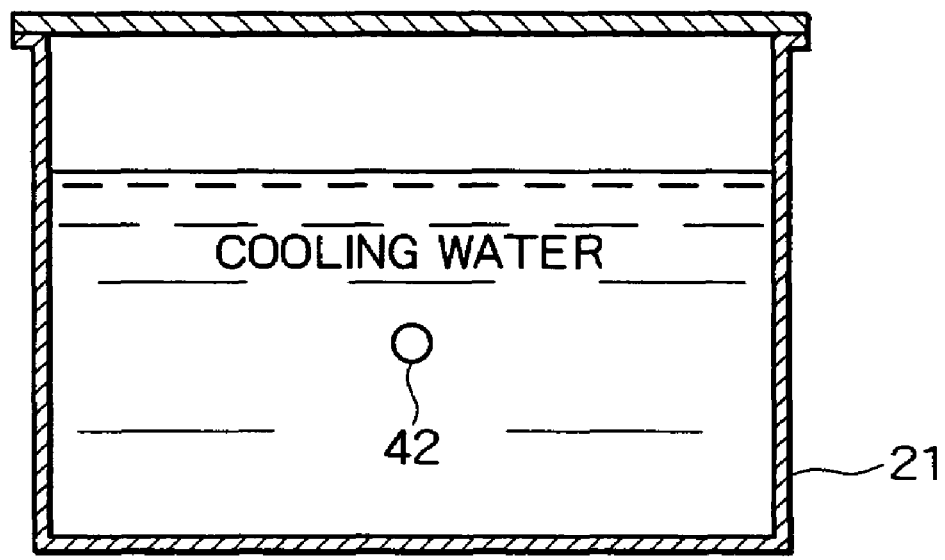
FIG. 7 is a C-C cross-sectional view of the main cooling section in FIG. 6.

Next, description will be made for comparison with a device in which the water spray nozzles 22 are not provided in the reservoir tank 21. FIG. 6 is the plan view schematically showing the constitution of the cooling device being a comparative example, and FIG. 7 is the C-C cross-sectional view of the main cooling section in FIG. 6. Herein, the same reference numerals as those of FIG. 2 are applied in this comparative example for the same portions as the devices shown in FIG. 2. Specifically, as shown in FIG. 6 and FIG. 7, a difference in the comparative example from the embodiment is that no water spray nozzle is provided in the reservoir tank 21 of a main cooling section 20'. Water is filled in the reservoir tank 21 by a water supply tube (not shown).

Figure 8:
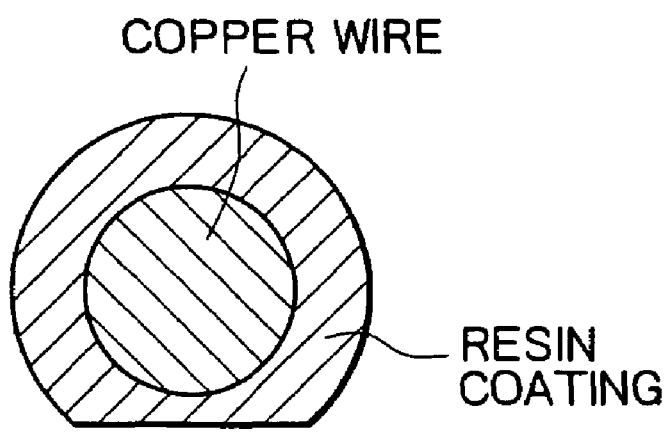
FIG. 8 is a view according to the comparative example and is a view for explaining the sectional shape of the wound coated wire.

In both the embodiment and the comparative example, the length of the receiving tank 11 in the coated wire traveling direction and the length of the reservoir tank 21 in the coated wire traveling direction were set to 1.5 m and 3 m respectively, and a coated wire (diameter: 1.6 mm) being a wire where resin had been coated to a copper wire (diameter: 1.0 mm) from the extruder was allowed to pass in the tanks at the traveling speed of 600 m/min for cooling. In the device of the embodiment, the gap between the mist spray nozzles 12 in the coated wire traveling direction was set to 70 mm (the same applies to comparative example), and the gap between the water spray nozzles 22 in the coated wire traveling direction was set to 70 mm. As a result, since the wire was not cooled down to a predetermined temperature and taken up passing in the haul-off machine in the comparative example, a part of the resin coating of the obtained coated wire was crushed to cause deformation as shown in FIG. 8.

Figure 5:
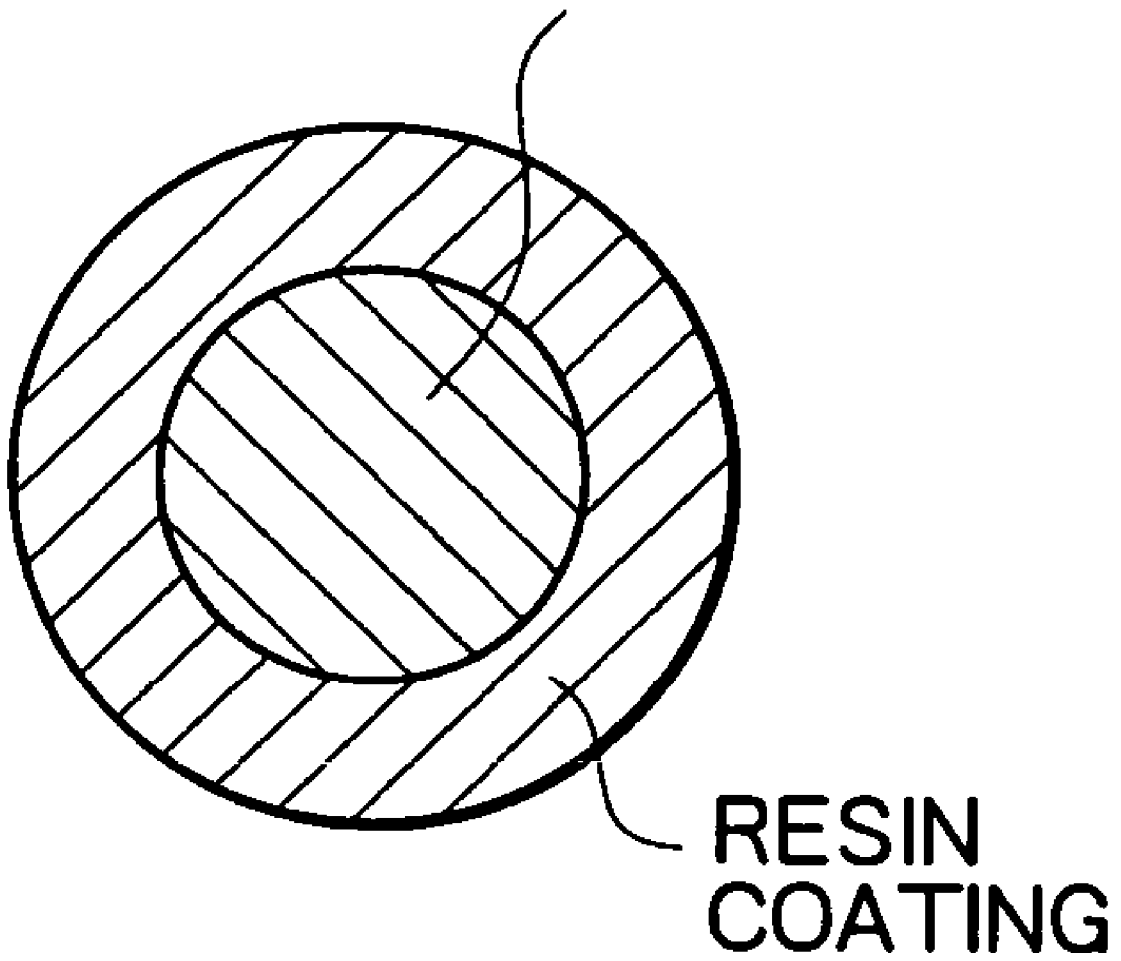
FIG. 5 is a view according to the present invention and is a view for explaining a sectional shape of a wound coated wire.

On the other hand, according to the device of the embodiment, since the wire was cooled down to a predetermined temperature for sufficient cooling and hardening of resin coating, a coated wire having a circular cross-section having no deformation was obtained as shown in FIG. 5.

Next, description will be made for the embodiment of the coated wire haul-off machine of the present invention based on the drawings as follows. FIG. 9 is the schematic view of the coated wire haul-off machine according to one embodiment of the present invention, where 9A is the plan view and 9B is the side sectional view. FIG. 10 is the perspective view of the principal portion of the coated wire haul-off machine shown in FIG. 9.

As shown in FIG. 9 and FIG. 10, the coated wire haul-off machine of this embodiment includes a casing 83 that is arranged such that a traveling path of a coated wire 81, which comes out of the cooling water tank and on the way to the take-up machine, passes inside the casing 83. In the casing 83, there is provided a pair of front and rear capstans 84, 85, a water film flow forming groove body 86 for cooling down the coated wire 81 by allowing it to travel in water film flow, a water supply tube 90 for flowing the cooling water in the water film flow forming groove body 86, and a groove body lifting and lowering device 91 to lift and lower the water film flow forming groove body 86. In FIG. 9, the left side is the upper stream of the coated wire traveling direction and the right side is the lower stream of the coated wire traveling direction.

The casing 83 is longer in the traveling direction (right and left directions of FIG. 9) of the coated wire 81, formed in a box shape whose upper portion is opened. A lid member can be attached to the casing 83 in an openable and closable manner. The front and rear capstans 84, 85 are supported freely rotatably and in a cantilever state around a horizontal shaft orthogonal to the traveling direction of the coated wire 81. The front capstan 84 (right one in FIG. 9) of the both capstans 84, 85 serves as a drive shaft that is driven for rotation by an outside motor (not shown) of the casing 83, and the rear capstan 85 (left one in FIG. 9) serves as a driven shaft that is not driven for rotation. Consequently, the coated wire 81 from the cooling water tank, which entered the casing 83, first winds around the front capstan 84 from above and returns backward, and then, winds around the rear capstan 85 from below and is sent forward again to reciprocate between the front and rear capstans 84, 85. After several times of the reciprocation, the wire is sent out to the lower stream in the coated wire traveling direction of the casing 83.

Figure 18:
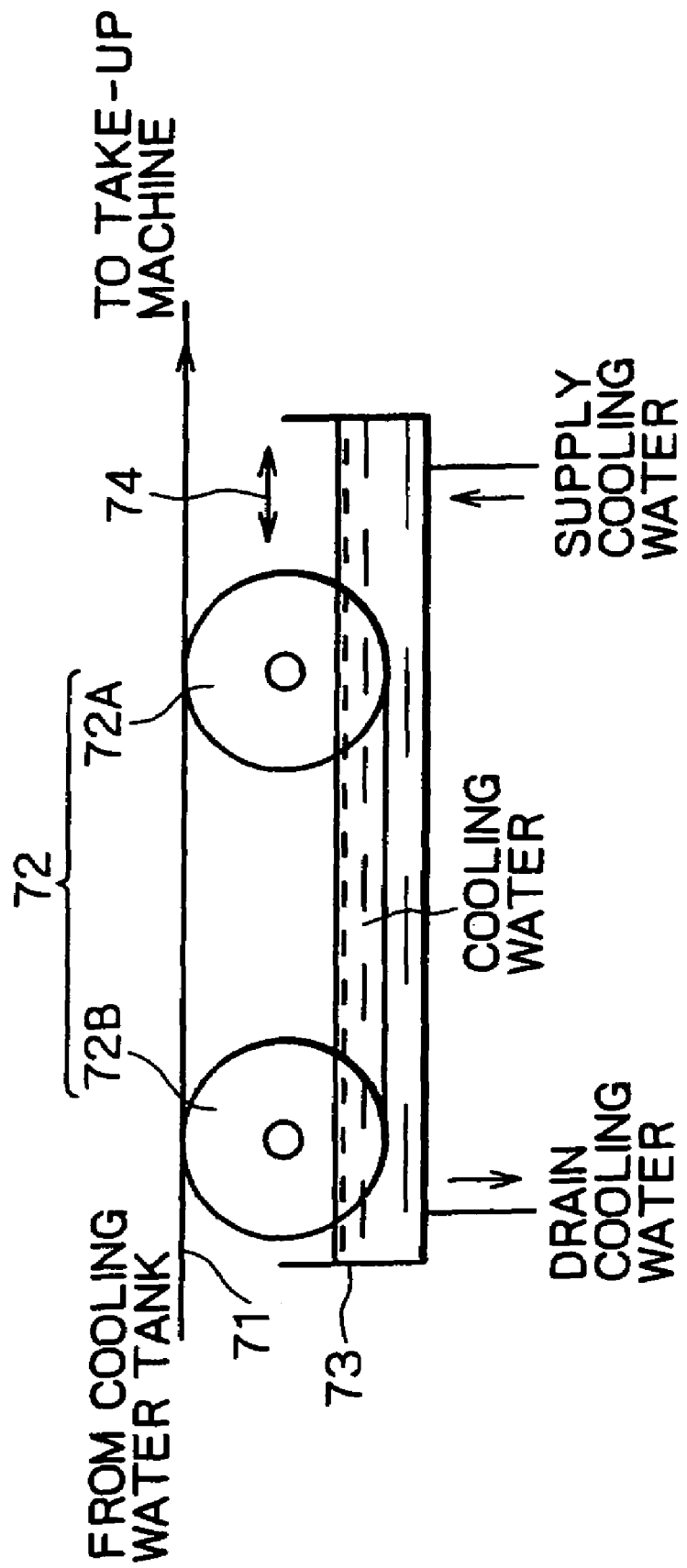
FIG. 18 is a schematic constitution view showing a constitution of a wire cooling device according to prior art.

The water film flow forming groove body 86 is arranged between the front and rear capstans 84, 85 and extends along the lower coated wire traveling path between the front and rear capstans 84, 85. Unlike the prior art shown in FIG. 18, the front and rear capstans 84, 85 are constituted not to soak in the water film flow in the water film flow forming groove body 86. In this embodiment, the water film flow forming groove body 86 has a rectangular groove 86a at cross section. More specifically, the water film flow forming groove body 86 comprises a bottom plate extending along the lower coated wire traveling path and a left plate and a right plate which are severally provided on both sides along the lower coated wire traveling path of the bottom plate (refer to FIG. 11). The groove body 86 has wall plates for preventing the runoff of the water film flow in the width direction (in the orthogonal direction to the traveling direction of the coated wire 81), and the input end and the output end of the coated wire are completely opened.

The water supply tube 90, which has a plurality of spray nozzles 90a provided in a gap and extends in the width direction of the water film flow forming groove body 86, is provided directly above a coated wire input side position of the water film flow forming groove body 86. The spray nozzles 90a of the water supply tube 90 spray the cooling water in a shower state to form the water film flow of a low water level from the coated wire input position to a coated wire output position of the water film flow forming groove body 86. A drain container, drain piping and the like (not shown) for sending back and circulating the cooling water dropped from the water film flow forming groove body 86 are provided outside the bottom area of the casing 83.

Figure 12:
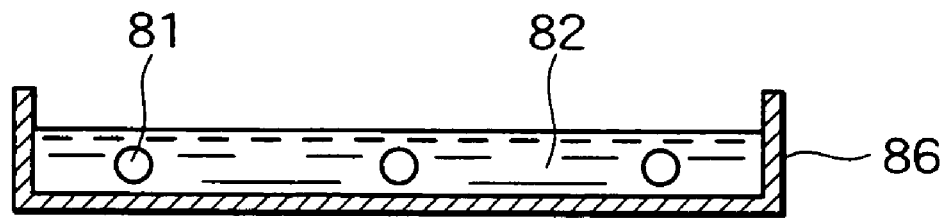
FIG. 12 is a cross-sectional view for explaining the water film flow forming groove body in FIG. 9.

As described, since the coated wire haul-off machine of this embodiment includes the water film flow forming groove body 86 unlike the conventional one, by allowing the coated wire 81, which travels on the lower coated wire traveling path between the front and rear capstans 84, 85, to travel in water film flow 82 being the cooling water of a low water level as shown in FIG. 12, stress caused by the contact with the cooling water and applied to the coated wire 81 is minimized and a contact area and contact time between the coated wire 81 and the cooling water is increased compared to the conventional one using shower cooling water. Therefore, it is possible to maintain high cooling performance to the coated wire 81. Accordingly, the coated wire 81 can be cooled down to a predetermined temperature without reducing adhesive force between resin coating and core wire due to stretch of the coated wire by the stress.

The water film flow described here is water flow which is formed when water is allowed to flow on the water film flow forming groove body, and it means water flow having a predetermined water level from the bottom plate of the water film flow forming groove body.

To cool down the coated wire by water film flow, a water film flow level at least the same as the outer diameter of the coated wire to completely soak the coated wire. On the other hand, since the water film flow forming groove body is constituted to allow water to run off from its end and new water is constantly supplied to the groove body, it is practically difficult to further improve a cooling effect even when the depth of the water film flow is set to twice or more the outer diameter of the coated wire. Therefore, water flow having a water depth equivalent to or up to twice the outer diameter of the coated wire being a cooling subject is enough.

Further, the coated wire haul-off machine of this embodiment is provided with the water supply tube 90 for allowing the cooling water to flow in the water film flow forming groove body 86 on the coated wire input side of the water film flow forming groove body 86. Thus, the cooling water is carried by the traveling coated wire 81, the cooling water easily reaches the entire coated wire 81 on the lower coated wire traveling path, and the machine can exert high cooling performance to the coated wire 81. Furthermore, the stress applied to the coated wire 81 is minimized since the water film flow 82 flows in the same direction as the coated wire traveling direction.

Figure 13:
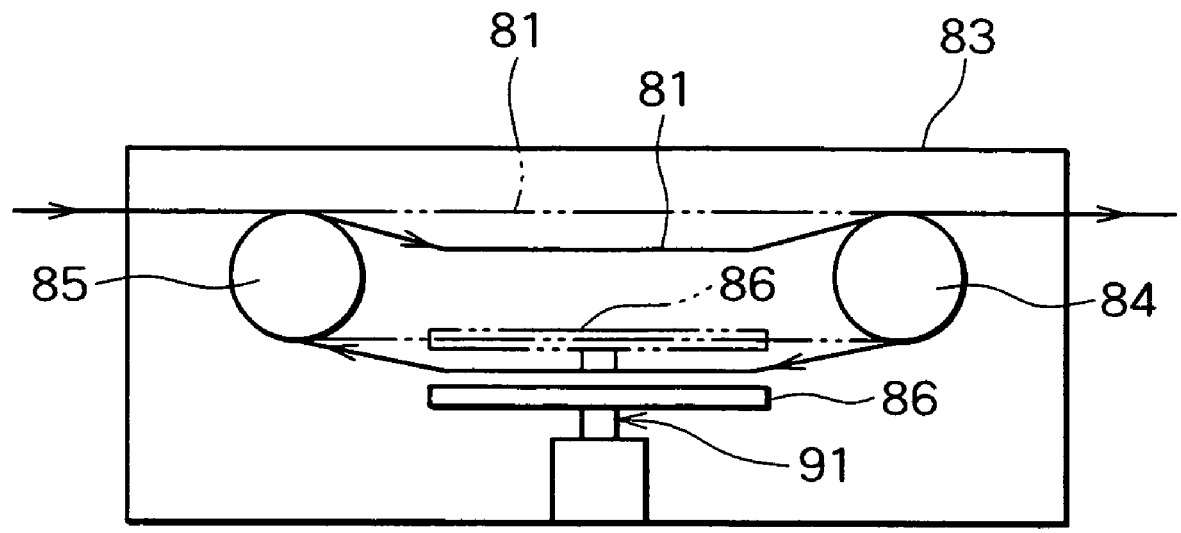
FIG. 13 is a view for explaining a groove body lifting and lowering device according to the present invention.

Next, description will be made for the groove body lifting and lowering device 91 that lifts and lowers the water film flow forming groove body 86. FIG. 13 is the view for explaining the groove body lifting and lowering device according to the present invention.

In the coated wire haul-off machine, the core wire (copper wire) is wound around the front and rear capstans 84, 85 first in manufacturing the coated wire. Then, when resin coating is started by the extruder, an area having only the core wire and a coated wire area where resin coating has been performed are simultaneously present between the front and rear capstans 84, 85. At this point, a traveling speed difference is generated due to a difference in wire diameter between the core wire and the coated wire, and wire slack could occur between the front and rear capstans 84, 85 when starting manufacturing of the coated wire as shown by solid line in FIG. 13.

In the coated wire haul-off machine according to this embodiment, the water film flow forming groove body 86 is lowered by the groove body lifting and lowering device 91 below a regular cooling position (shown by imaginary line in FIG. 13) when starting manufacturing of the coated wire. With this constitution, even if the wire slack occurs between the front and rear capstans 84, 85 when starting manufacturing of the coated wire, interference between the wire traveling between the front and rear capstans 84, 85 and the surface of the water film flow forming groove body 86 is avoided and the wire slack can be prevented from being transmitted to the front and rear capstans 84, 85 by the interference. As a result, a wire can be prevented from being come off the front and rear capstans 84, 85. When a predetermined period of time passes to eliminate the above-described simultaneous presence state, the groove body lifting and lowering device 91 is designed to return the water film flow forming groove body 86 to the regular cooling position. The groove body lifting and lowering device 91 can be constituted by an air cylinder or the like.

Figure 14:
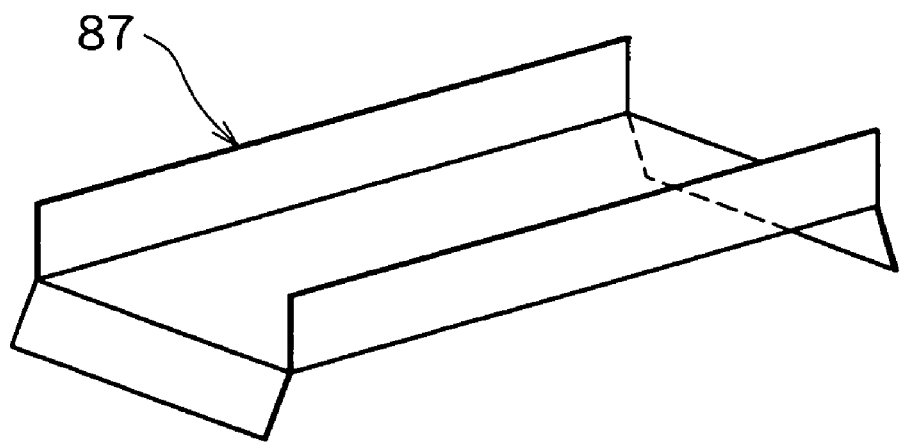
FIG. 14 is a perspective view showing another example of the water film flow forming groove body according to the present invention.
Figure 15:
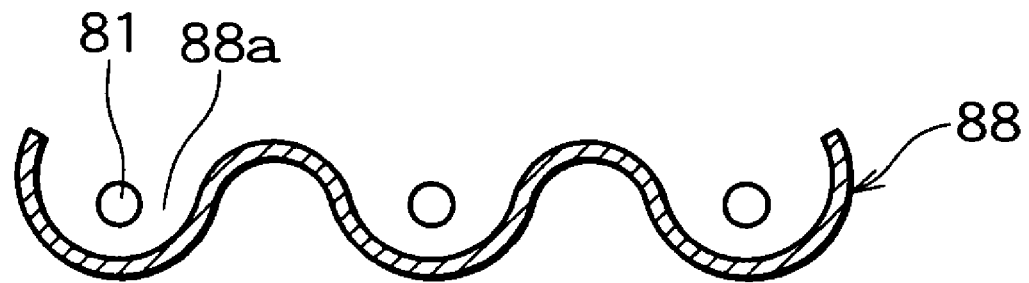
FIG. 15 is a cross-sectional view showing another example of the water film flow forming groove body according to the present invention.
Figure 16:
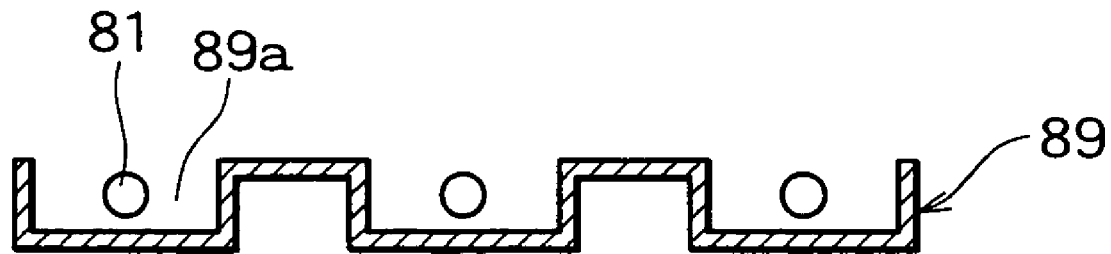
FIG. 16 is a cross-sectional view showing still another example of the water film flow forming groove body according to the present invention.
Figure 17:
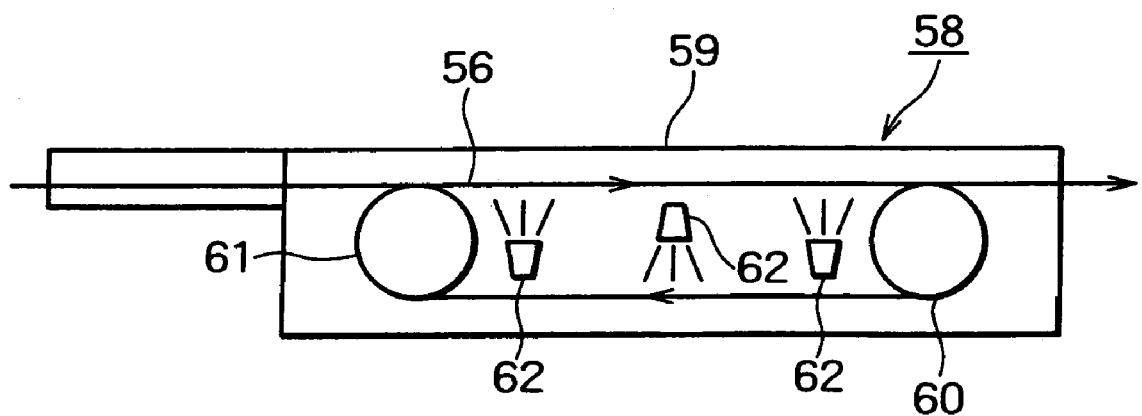
FIG. 17 is a schematic constitution view showing an example of a conventional coated wire haul-off machine.

FIG. 14 is the perspective view showing another example of the water film flow forming groove body according to the present invention, FIG. 15 is the cross-sectional view showing another example of the water film flow forming groove body according to the present invention, and FIG. 16 is the cross-sectional view showing still another example of the water film flow forming groove body according to the present invention.

Figure 11:
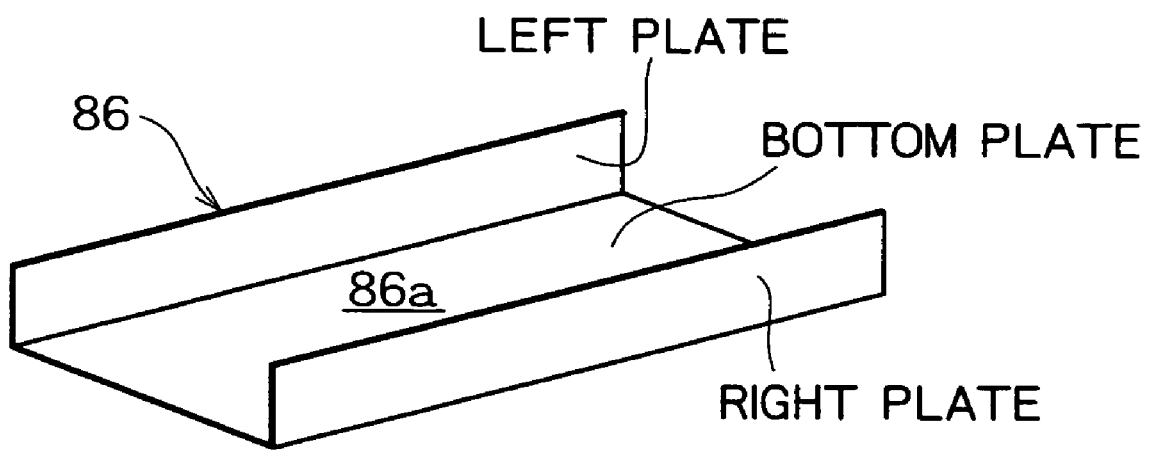
FIG. 11 is a perspective view showing a water film flow forming groove body in FIG. 9.

A water film flow forming groove body 87 shown in FIG. 14 is constituted that wall plates of a coated wire input end and an output end are bent downward, being different from the water film flow forming groove body 86 shown in FIG. 11, and such a constitution is designed to improve strength. A water film flow forming groove body 88 shown in FIG. 15 has three semi-circular-shaped grooves 88a at cross-section in this example where they extend along each coated wire traveling path of the lower coated wire traveling groove as shown in the drawing. Further, a water film flow forming groove body 89 shown in FIG. 16 has three rectangular-shaped grooves 89a at cross-section in this example where they extend along each coated wire traveling path of the lower coated wire traveling groove as shown in the drawing. Consequently, as the water film flow forming groove body to form the water film flow, the water film flow forming groove body 88, 89 with the constitution having the grooves 88a, 89a extending along each coated wire traveling path of the lower coated wire traveling groove, as shown in FIG. 15 and FIG. 16, may be formed.

Furthermore, in the water film flow forming groove body 86 shown in FIG. 11, the input end and the output end of the coated wire traveling direction are completely opened. However, the water film flow forming groove body of the present invention is not limited to such constitutions, but any constitution may be used where water film flow of a required water level can be realized and the coated wire can travel in the water film flow.

What is claimed is:

1. A wire insulating line, comprising:
   an extruder for coating resin to a core wire;
   a cooling device for cooling down the coated wire, which is extruded from said extruder and allowed to travel, in cooling water in a reservoir tank;
   a coated wire haul-off machine that hauls the coated wire from said cooling device to allow it to travel and cools down the coated wire by cooling water; and
   a take-up machine for taking up the coated wire from said coated wire haul-off machine,
   wherein said coated wire haul-off machine comprises:
   front and rear capstans for winding the coated wire, which comes out of said reservoir tank and on the way to said take-up machine after the wire is resin-coated and led into said reservoir tank, by allowing the wire to reciprocate back and forth for several times; and
   a water film flow forming groove body to form water film flow for cooling, which is arranged between said front and rear capstans and extends along a lower coated wire traveling path between said front and rear capstans such that the front and rear capstans are not in the water film flow, wherein said coated wire haul-off machine is constituted that said coated wire is allowed to travel in said water film flow between said front and rear capstans.

2. The wire insulating line according to claim 1, wherein said coated wire haul-off machine includes a water supply tube for allowing the cooling water to flow from a coated wire input side of said water film flow forming groove body into said water film flow forming groove body.

3. The wire insulating line according to claim 1, wherein said coated wire haul-off machine further comprises a groove body lifting and lowering device for temporarily lowering said water film flow forming groove body from a regular position for cooling the coated wire.

4. The wire insulating line according to claim 1, wherein said water film flow forming groove body comprises a bottom plate extending along the traveling path of said coated wire, and a left plate and a right plate which are provided on both sides of the bottom plate along the traveling path, and has wall plates in the orthogonal direction to said traveling direction, and an input end and an output end of said coated wire are completely opened.

5. A wire insulating line comprising:

an extruder for coating resin to a core wire;

a cooling device for cooling in cooling water the coated wire which is extruded from said extruder;

a coated wire haul-off machine that hauls the coated wire from said cooling device and further cools the coated wire by cooling water; and a take-up machine for taking up the coated wire from said coated wire haul-off machine, wherein said cooling device comprises:

a reservoir tank including means for maintaining a cooling water level higher than a level where the coated wire passes through the reservoir tank; and water spray nozzles that are provided in plural numbers in said reservoir tank below said cooling water level and with a gap along the coated wire traveling direction to spray water to said coated wire in said cooling water, and wherein said coated wire haul-off machine comprises:

front and rear capstans for winding the coated wire, which comes out of said reservoir tank and on the way to said take-up machine after the wire is resin-coated and led into said reservoir tank, by allowing the wire to reciprocate back and forth for several times;

a water film flow forming groove body to form water film flow for cooling, which is arranged between said front and rear capstans and extends along a lower coated wire traveling path between said front and rear capstans; and a groove body lifting and lowering device for temporarily lowering said water film flow forming groove body from a regular position for cooling the coated wire, wherein said coated wire haul-off machine is constituted that said coated wire is allowed to travel in said water film flow between said front and rear capstans.

6. A wire insulating line, comprising:

an extruder for coating resin to a core wire;

a cooling device for cooling down the coated wire, which is extruded from said extruder and allowed to travel, in cooling water in a reservoir tank;

a coated wire haul-off machine that hauls the coated wire from said cooling device to allow it to travel and cools down the coated wire by cooling water; and a take-up machine for taking up the coated wire from said coated wire haul-off machine, wherein said coated wire haul-off machine comprises:

front and rear capstans for winding the coated wire, which comes out of said reservoir tank and on the way to said take-up machine after the wire is resin-coated and led into said reservoir tank, by allowing the wire to reciprocate back and forth for several times;

means for forming a water film flow between said front and rear capstans and along a lower coated wire traveling path between said front and rear capstans such that the front and rear capstans are not in the water film flow; and means for causing said coated wire to travel in said water film flow between said front and rear capstans.

7. The wire insulating line according to claim 6, wherein said coated wire haul-off machine includes a water supply tube positioned for allowing the cooling water to flow from a coated wire input side of said means for forming a water film flow into said means for forming a water film flow.

8. The wire insulating line according to claim 6, wherein said coated wire haul-off machine further comprises means for temporarily lowering said means for forming a water film flow from a position for cooling the coated wire.

9. The wire insulating line according to claim 6, wherein said means for forming a water film flow comprises a bottom plate extending along the traveling path of said coated wire, and a left plate and a right plate which are provided on both sides of the bottom plate along the traveling path, and wall plates in the orthogonal direction to said traveling direction, wherein an input end and an output end of said coated wire are completely opened.

* * * * *